US005557338A

United States Patent [19]

Maze et al.

[11] Patent Number: 5,557,338

[45] Date of Patent: Sep. 17, 1996

[54] TELEVISION RECEIVER USING RECEIVED CHANNEL GUIDE INFORMATION AND A SECONDARY VIDEO SIGNAL PROCESSOR FOR DISPLAYING SECONDARY CHANNEL INFORMATION

[75] Inventors: Kenneth W. Maze; Joseph W. Forler, both of Indianapolis, Ind.

[73] Assignee: Thomson Consumer Electronics, Inc., Indianapolis, Ind.

[21] Appl. No.: 419,649

[22] Filed: Apr. 5, 1995

[51] Int. Cl.[6] .............................. H04N 5/45; H04N 7/173

[52] U.S. Cl. .......................... 348/565; 348/906; 348/731; 348/569

[58] Field of Search .................................... 348/468, 565, 348/563, 564, 569, 906, 731; H04N 5/45, 5/445, 7/173, 7/15

[56] References Cited

U.S. PATENT DOCUMENTS

| | | | |
|---|---|---|---|
| 4,706,121 | 11/1987 | Young | 358/142 |
| 4,977,455 | 12/1990 | Young | 358/142 |
| 5,047,867 | 9/1991 | Strubble et al. | 348/564 |
| 5,128,766 | 7/1992 | Choi | 348/564 |
| 5,151,789 | 9/1992 | Young | 358/194 |
| 5,223,924 | 6/1993 | Strubble | 348/564 |
| 5,353,121 | 10/1994 | Young et al. | 348/563 |

OTHER PUBLICATIONS

A portion of the User's Manual for the Mitsubishi CS35803 Television Receiver.

*Primary Examiner*—Safet Metjahic
*Assistant Examiner*—Glenton B. Burgess
*Attorney, Agent, or Firm*—Joseph S. Tripoli; Thomas F. Lenihan; Peter M. Emanuel

[57] ABSTRACT

A television receiver system having secondary picture display capability (such as PIP or POP) includes two tuners and signal processing arrangements, and circuitry for receiving a transmitted channel guide. In response to a "BROWSE" command, the receiver maintains the currently-tuned first channel as the source for the main picture, displays text related to a television show on a second channel, activates the secondary picture display circuitry, and tunes the second tuner to the second channel. In this way, the viewer can simultaneously get the benefit of both a text description of the television show on the second channel and view a secondary image of the television show on the second channel, without tuning away from the first channel supplying the main picture.

9 Claims, 5 Drawing Sheets

1/5

TELEVISION RECEIVER USING RECEIVED CHANNEL GUIDE INFORMATION AND A SECONDARY VIDEO SIGNAL PROCESSOR FOR DISPLAYING SECONDARY CHANNEL INFORMATION

FIELD OF THE INVENTION

The subject invention concerns the field of television receivers, and relates specifically to a television receiver using channel guide information and secondary video processing circuitry.

BACKGROUND OF THE INVENTION

More television channels are now available to viewers than ever before. Some cable systems currently deliver thirty channels, and a commercially available satellite system offers up to 150 channels. Several different broadcast channel guide displays are available to help the user to organize all this channel information for use. These broadcast channel guide displays provide on-screen text descriptions of currently-tuned television shows. In addition, a user may "browse" other channels without tuning them to see what is currently on the air by sequentially calling up text descriptions of the other channels for display. If the user finds the description sufficiently interesting, he may tune the browsed channel by pressing a key (e.g., ENTER) on his remote control unit. Unfortunately, one only gets a text description of the other television shows; one cannot see the video corresponding to the description of the "browsed" (i.e., untuned) channels. And so, a user may not be fully informed about a given browsed channel.

SUMMARY OF THE INVENTION

A television receiver system having secondary picture display capability (such as PIP or POP) includes two tuners and signal processing arrangements, and circuitry for receiving a transmitted channel guide. In response to a "BROWSE" command, the receiver maintains the currently-tuned first channel as the source for the main picture, displays text related to a television show on a second channel, activates the secondary picture display circuitry, and tunes the second tuner to the second channel. In this way, the viewer can simultaneously get the benefit of both a text description of the television show on the second channel and view a secondary image of the television show on the second channel, without tuning away from the first channel supplying the main picture.

DETAILED DESCRIPTION OF THE EMBODIMENT

Figure 1:
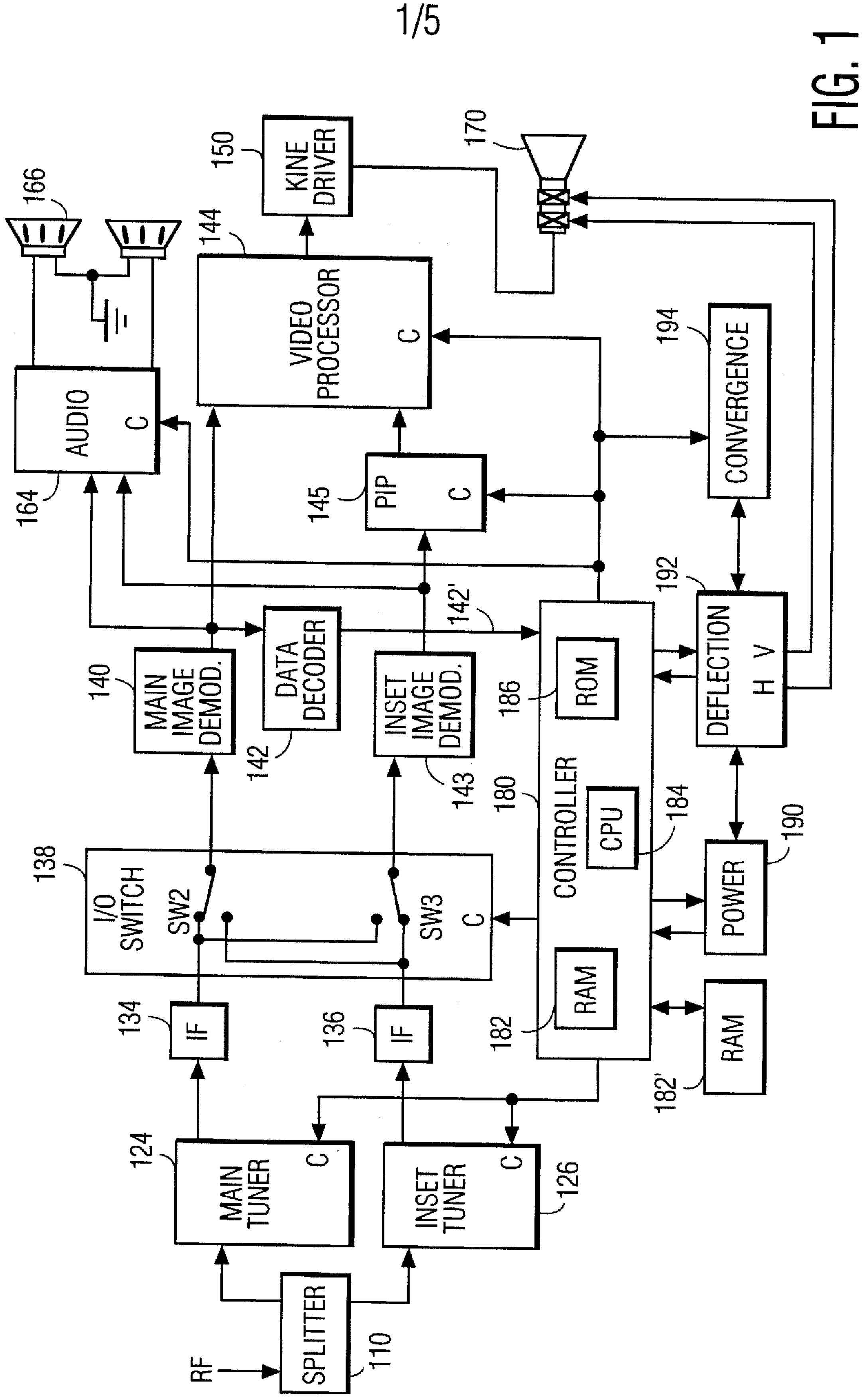
FIG. 1 shows a simplified block diagram of a television receiver suitable for use with the invention.
Figure 2A:
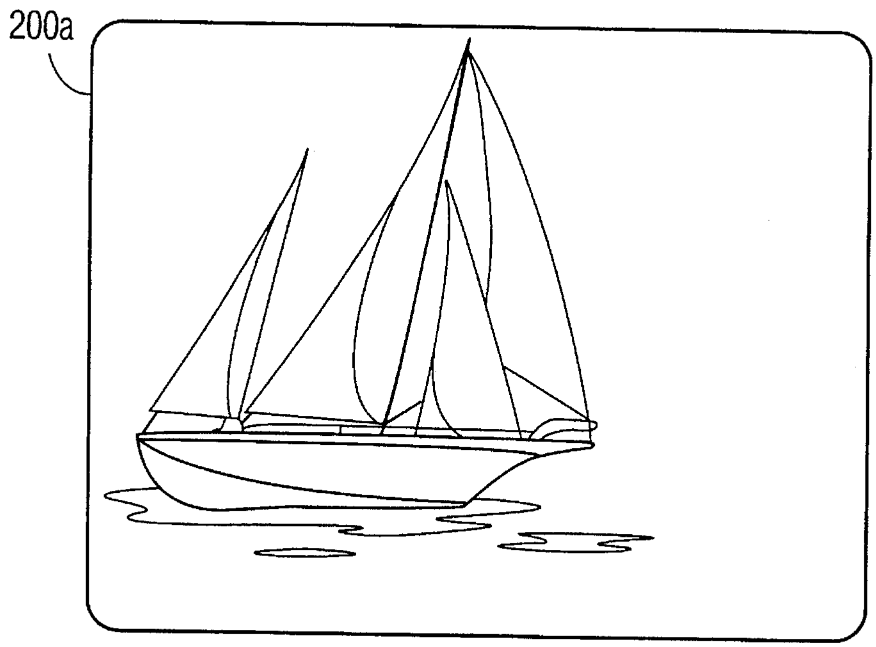
FIGS. 2*a*, 2*b*, and 3*a*, show display screens of a television receiver as known from the prior art.
Figure 2B:
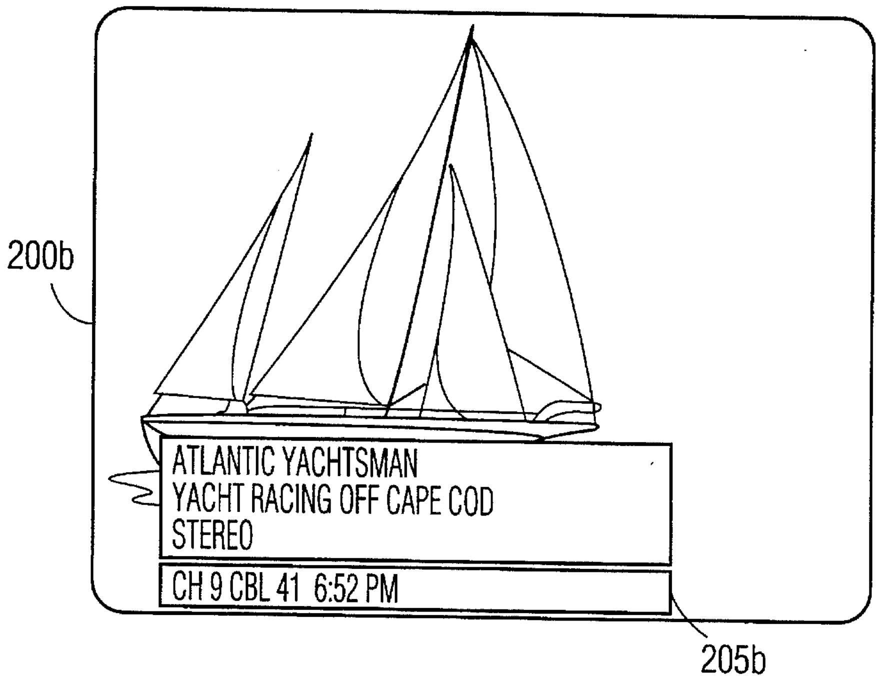

FIG. 1 shows in block diagram form, the circuitry of a television receiver which receives and processes broadcast television signals. Prior art images produced in such a receiver are shown in FIGS. 2*a* and 2*b*. The receiver of FIG. 1 also includes a PIP processor for displaying signals in a much smaller size, known as an inset image. In a sense, FIG. 2*b* also illustrates the problem to be solved, as will be explained below.

The screen display of prior art FIG. 2*a* shows a main video image of a sailboat, received on a given channel. The screen display of prior art FIG. 2*b* shows a main video image of a sailboat, and a text description of the currently-tuned television show, in this case, a description of Atlantic Yacht Racing. The description is sent along with television signals on a certain channel, and stored in memory. This description may be caused to appear on the screen by pressing a key, such as INFO, on a remote control unit.

Figure 3A:
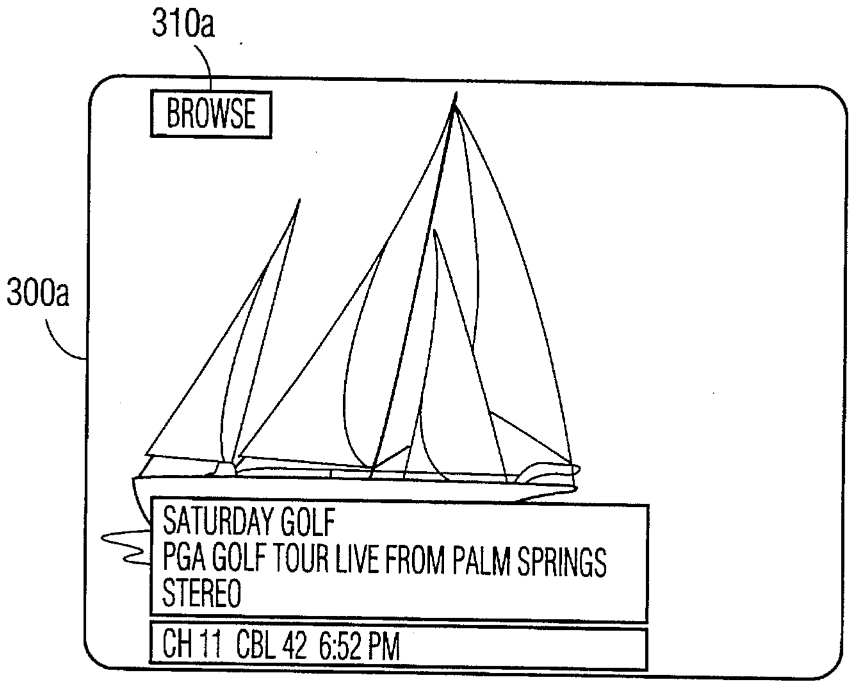

Prior art FIG. 3*a* illustrates the result of a BROWSE command sent by a user via a remote control unit. Note that in FIG. 3*a*, the main image 300*a* is the same as main image 200*b* of FIG. 2*b* (i.e., a sailboat), but the text description 305*a* no longer refers to the currently-tuned channel (e.g. cable channel 41), but rather to another television show (e.g., Saturday Golf) on another channel (e.g. cable channel 42). Note also that the word "BROWSE" appears (310*a*) in the upper left portion of the screen (300*a*) in order to alert the user that the displayed text description (305*a*) bears no relationship to the displayed video image.

Figure 3B:
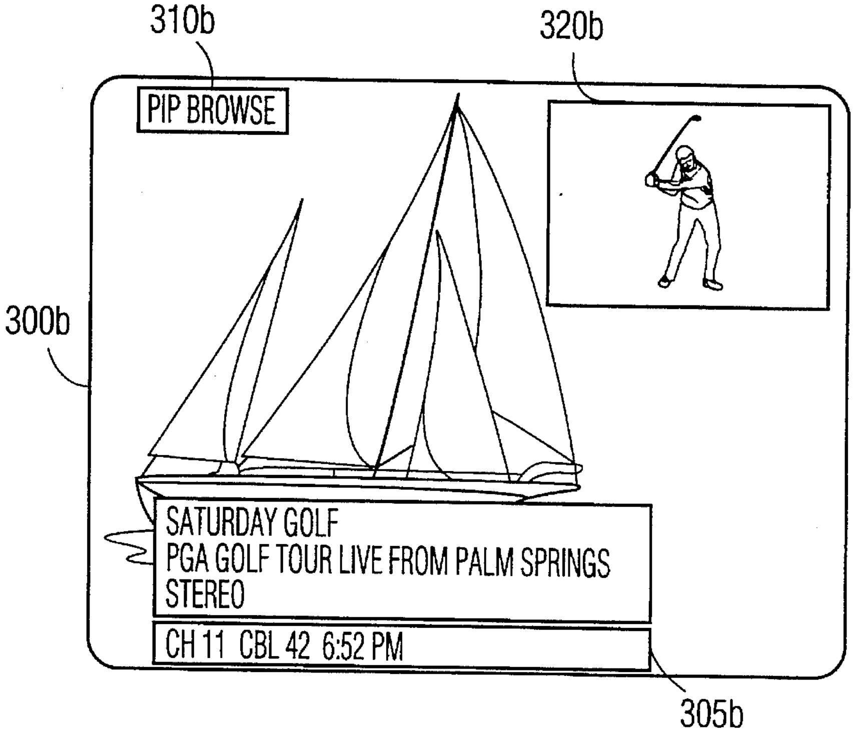
FIGS. 3*b* and 4 show display screens of a television receiver in accordance with embodiments of the subject invention.

A screen display in accordance with the subject invention is shown in FIG. 3*b*. In FIG. 3*b*, a BROWSE command causes the display of a text description of another television show on another channel, causes the main tuner to remain tuned to the current channel, and causes a text message (310*b*) to appear in the upper left portion of the screen, as described above with respect to FIG. 3*a*. However, in contrast to the prior art, apparatus according to the subject invention causes the text message "PIP BROWSE" to be displayed, causes a secondary (PIP (i.e., picture-in-picture, or pix-in-pix), or POP (i.e., picture-outside-picture)) tuner to tune to the channel carrying the television show corresponding to the displayed text description (305*b*) and causes a display of the PIP or POP image (320*b*) in a predetermined location, so as not to interfere with the display of the text description. In this embodiment, the displayed phrase PIP BROWSE (310*b*) alerts the user that the displayed text description (305*b*) refers to a displayed PIP (or POP) video image. In this way, a video information is conveyed to the viewer that actually does correspond to the displayed text description. Note that in prior receivers which produced the screen display of FIG. 3*a*, no tuning commands needed to be searched or generated. The displayed text description corresponding to the next channel in the list was merely read from the next area of memory.

In contrast, in the subject invention, a search is made of RAM 182, 182' to match channel tuning information with channel information from the BROWSE mode description, and that channel tuning information is applied to a PIP (or POP) tuner 126 for tuning and display in a portion of the screen away from the text description area.

Figure 4:
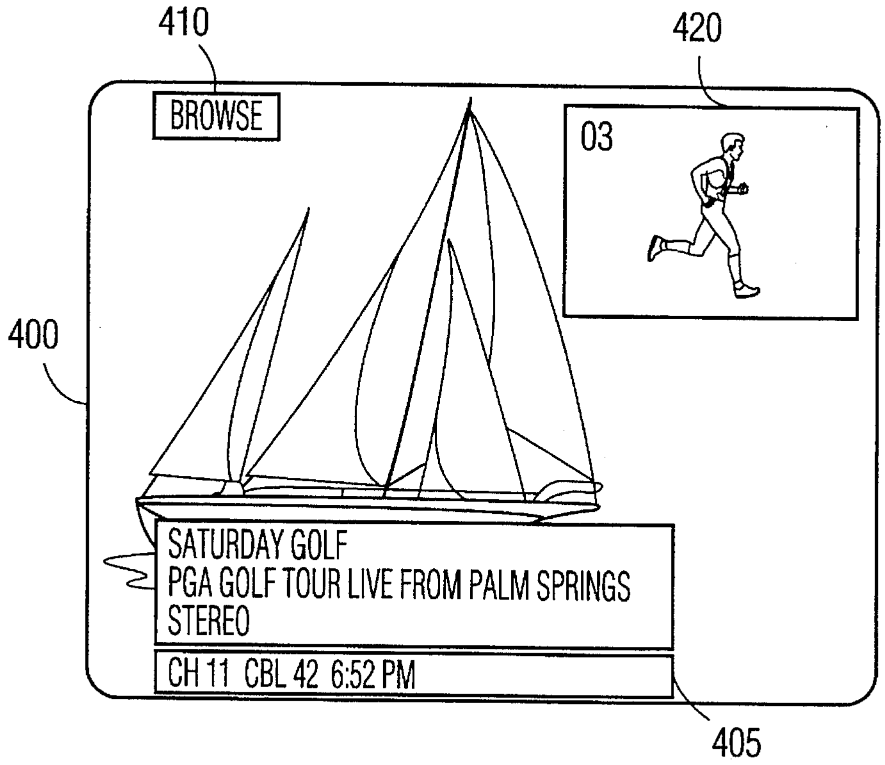

In a second embodiment of the invention, shown in FIG. 4, it is recognized that when a viewer is already using the PIP (or POP) function, it may be confusing to the viewer for the BROWSE feature to commandeer the PIP (or POP) display for its own purposes. Therefore, it is envisioned that when a viewer is already using PIP (or POP) when the BROWSE feature is invoked, the BROWSE feature will revert to a text-description-only system, and leave the PIP (or POP) display under command of the user. In such a case, to avoid confusion, the label "PIP BROWSE" may be displayed when the PIP is under control of the BROWSE feature, and label "BROWSE" may be displayed, when the PIP is under control of the user. Note that in FIG. 4, PIP 420 is active and showing a footrace on channel 03, text display 405 is describing a golf tournament on channel 11, and a label "BROWSE" 410 is displayed as an indication that text description 405 does not apply to the PIP display 420. Note that when BROWSE was activated, PIP display 420 was moved to a location in which it would not interfere with the display of text description 405.

With foregoing in mind, the apparatus of FIG. 1, for carrying out the invention, will now be described. RF signals are applied to the input of a signal splitter 110. RF signals from a first output of signal splitter 110 are applied to a main tuner 124 and to an inset tuner 126. Both of the above-mentioned tuners are controlled by a controller 180. Controller 180, includes a RAM (Random Access Memory) 182, a CPU (Central Processing Unit) 184, and a ROM (Read Only Memory) 186. Controller 180 may be a microcomputer, a microprocessor, or a dedicated custom integrated circuit controller. RAM 182 and ROM 186 may be either internal or external to controller 180, although due to the amount of text data to be stored, it is preferable that an external RAM 182' be provided. Controller 180 also controls other portions of the television receiver which are not particularly relevant to the subject invention, such as a power unit 190, a deflection unit 192, and a convergence assembly 194. RAM 182' may be used to store text descriptions for display and channel tuning related data for the PIP BROWSE feature. The required descriptions and data are coupled to controller 186 via an input line 142' from a data decoder 142.

Main tuner 124 and inset tuner 126 convert their respective received RF signals to an intermediate frequency (IF) and apply the IF signal to a respective IF amplifier 134, 136. and provides audio signals to one input of an AUDIO amplifier block 164, which demodulates stereo audio signals, amplifies the signals and applies them to a pair of speakers 166.

Main picture IF unit 134 and inset picture IF unit 136 are cross-connected to respective poles of an I/O switch arrangement 138 comprising video switches SW2 and SW3 which operate independently of one another under control of controller 180. The wiper (i.e., movable contact) of switch SW3 is connected to the input of an INSET IMAGE DEMODULATOR 143 which converts the IF signal to a baseband video signal and applies it to a PIP unit 145 for sampling and storage under control of controller 180. The output of PIP unit 145 is applied to one input of a VIDEO PROCESSOR unit 144.

The wiper (i.e., movable contact) of switch SW2 is connected to the input of an MAIN IMAGE DEMODULATOR 140 which converts the IF signal to a baseband video signal and applies it to the other input of VIDEO PROCESSOR unit 144. VIDEO PROCESSOR unit 144 creates a combined image comprising a main picture and a PIP, wherein the PIP image is supplied by PIP unit 145. The output of VIDEO PROCESSOR unit 144 is applied to a KINE DRIVER unit 150 for amplification. KINE DRIVER unit 150 applies the amplified signal to the input terminals of a display device 170. Of course, display device 170 may be a picture tube, a set of projection tubes, or an LCD (Liquid crystal display) device.

AUDIO unit 164 operates under control of controller 180, and includes audio selection circuitry for selecting the proper audio signal which accompanies the main image. In this regard, AUDIO unit 164 has an input for receiving AUDIO signals associated with the main signal, and a second input for receiving audio signals associated with the inset signal.

POWER SUPPLY unit 190, includes both standby and operating power supplies. DEFLECTION unit 192 provides horizontal (H) and vertical (V) deflection signals, and CONVERGENCE unit 194 controls proper registration of the R, G, and B, color signals on display device 170.

The operation of a PIP BROWSE feature according to the subject invention will be described with reference to FIGS. **3*b* and 4, the flowchart of FIG. 5, and circuitry of FIG. 1. In FIG. 3*b*, an image of a yacht race is received and displayed as the main image 300*a*, and a video image of a golf tournament is received and displayed as an inset image 320*b*. A text description 305*b* relating to the golf tournament is displayed in a text display area, and a label "PIP BROWSE" 310*b*** is displayed at the top of the screen.

Figure 5:
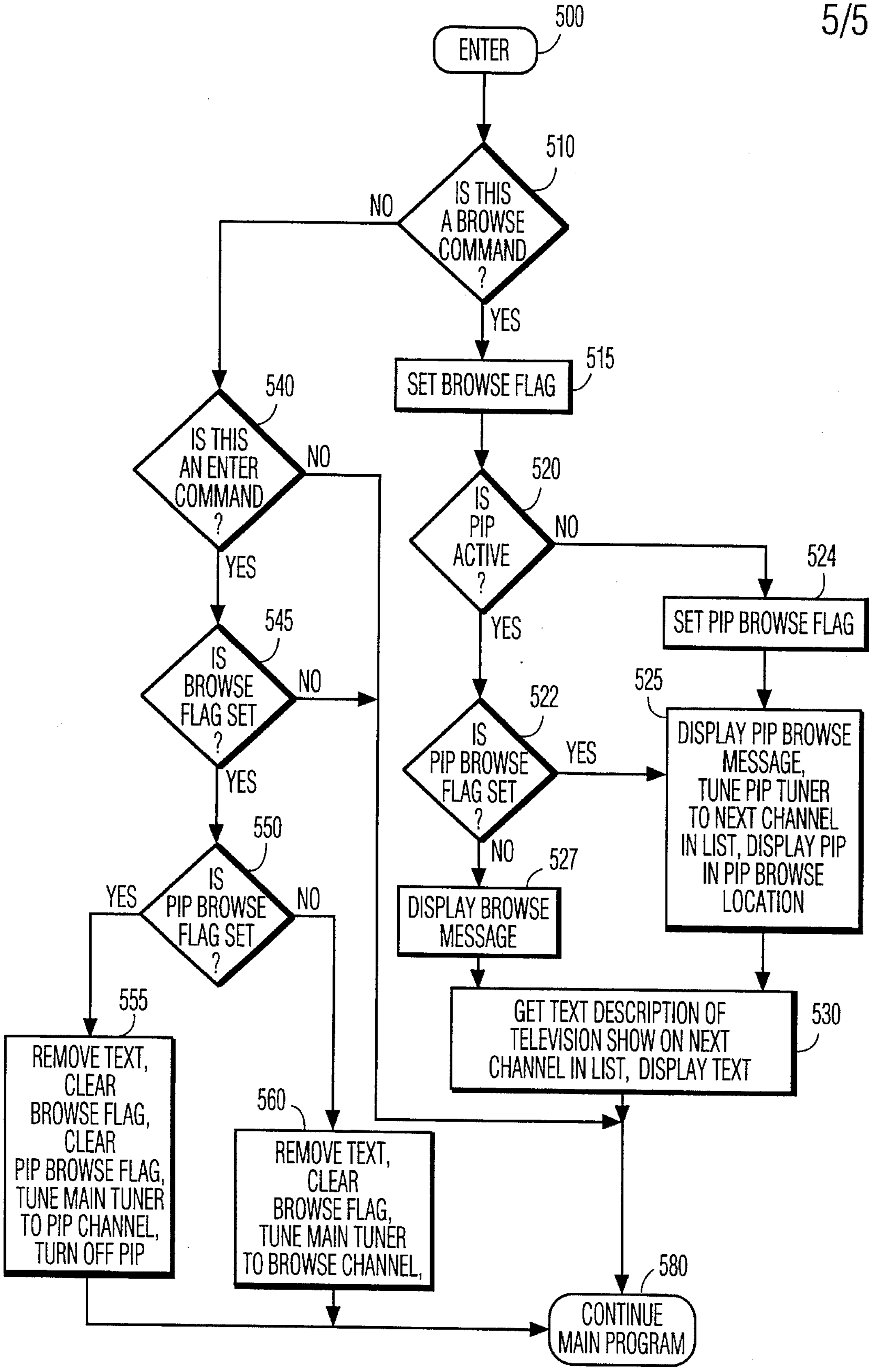
FIG. 5 is an illustration of a flowchart showing the relevant portion of the control program for the controller of FIG. 1.

The "PIP BROWSE" is accomplished by use of that portion of the control program of controller 180 which is illustrated in FIG. 5. Step 500 is entered upon receiving a command from a remote control unit (not shown). At step 510, the command is examined to determine if it is a BROWSE command. If so, a BROWSE flag is set at step 515 to indicate that the BROWSE function is active. The routine then advances to step 520 to determine if the PIP is already active. If not, at step 524 the PIP BROWSE FLAG is set. At step 525, PIP tuner 126 is tuned to the next channel in the BROWSE list, and the PIP image is displayed at a location in which it will not interfere with the text description. At step 530, the text description of the currently-running television show on the next channel in the BROWSE list is displayed, and the routine is exited at step 580.

If at step 520, the PIP were found to be active, then it may be active because the user is already using the PIP feature, or it may be that the routine is already in the midst of a PIP BROWSE feature. At step 522 a test is made to determine if the PIP BROWSE FLAG is set. If so, then the routine is in the midst of a PIP BROWSE feature and the routine advances to step 525 to issue PIP-related commands. If the PIP BROWSE FLAG is not set, then PIP is being used by the viewer, and the routine defaults to a text mode only BROWSE feature, by advancing to step 527 at which a BROWSE message (as opposed to a PIP BROWSE message) is displayed. The routine then advances to step 530, bypassing the PIP-related commands at step 525.

If at step 510, the received command was not a BROWSE command, the NO path is taken to step 540 wherein a determination is made as to whether or not the received command is an ENTER command. If not, then the command relates to other areas of the command decoding program, and this portion of the routine is exited at step 580. If an ENTER command was received, the YES path is taken from step 540 to step 545 to see if the BROWSE flag is set. If not the routine is exited at step 580. If so, the YES path is again taken to step 550 to see if the PIP BROWSE FLAG is set. If so, the routine advances to step 555 where the text display is removed from the screen, the PIP BROWSE FLAG is cleared (i.e., reset), the BROWSE FLAG is cleared, main tuner 124 is tuned to the PIP tuner channel, and the PIP is turned off. The routine is then exited at step 580. If at step 550 the PIP BROWSE FLAG is not set, the routine advances to step 560 where the text display is removed from the screen after a few seconds, the BROWSE FLAG is cleared, and main tuner 124 is tuned to the channel number corresponding to the text description (i.e., the BROWSE Channel).

It is common practice in the manufacturing of television receivers to install a tuner of greater quality in the main channel, and a tuner of lesser quality in the PIP channel, because the difference is not noticeable due to the fact that the PIP image comprises only a sample of the available signal for a given channel. Alternatively, in step 555, if the tuners 124 and 126 are of similar quality, then instead of retuning main tuner 124 to the same channel as PIP tuner 126, one could merely switch the signals by activating switches SW2 and SW3 of FIG. 1.

When the PIP BROWSE feature is active, it is possible for the viewer to move the PIP image to a more desirable location of the screen. This new user-defined location can be stored in memory 182, 182' by controller 180 for use in subsequent PIP BROWSE sessions. The PIP image location for the PIP BROWSE feature would be maintained separately from the normal PIP image location.

It is recognized that some viewers may prefer not to use the PIP BROWSE feature. Therefore, it is envisioned that the feature be selectable via a menu choice. It is further noted that the text description data related to television shows may be transmitted during the vertical blanking interval of a television program, whether from an XDS (extended data service) data stream on the channel being currently tuned, or from a previously received and stored data stream containing information for all channels but transmitted on a particular channel. The text description data related to television shows also may be transmitted as part of a satellite system's channel guide. Both of the above-given alternatives are envisioned and are deemed to lie within the scope of the following claims.

The term "television receiver", as used in the specification and claims, refers to television receivers having a display device (commonly called television sets) and television receivers not having a display device (such as, videocassette recorders, satellite receivers, and cable converter units).

What is claimed is:

1. A television receiver, comprising:

a first tuner and signal processing arrangement for receiving and processing television signals;

a second tuner and signal processing arrangement for receiving and processing television signals;

user-operable data input circuitry adapted to receive user-entered data or commands;

a controller responsive to said user-entered data or commands for generating control signals;

memory circuitry for storing data relating to television shows on a plurality of channels, and storing tuning information for said plurality of channels;

a decoder for receiving and decoding said data relating to television shows on said plurality of channels, said decoder having an output coupled to said controller;

an on-screen display circuit for generating on-screen display signals; and a secondary image processor for generating signals which when displayed on a display screen cause the display of a secondary image;

said controller, in response to the entering of a BROWSE command by a user maintains a currently-tuned channel on said first tuner for providing a main image, tunes a second channel on said second tuner for providing said secondary image, causes said secondary image processor to display said secondary image and causes said on-screen display circuit to display text relating to a television show currently-running on said second channel.

2. The television receiver of claim 1 wherein, said controller causes a display of a menu-selectable option which when selected by a user causes said secondary image processor to display said secondary image in response to said BROWSE command.

3. The television receiver of claim 1 wherein, in response to said BROWSE command entered by a user, said secondary image is displayed in an area of a display screen not occupied by said text relating to said television show currently-running on said second channel.

4. A television receiver, comprising:

a first tuner and signal processing arrangement for receiving and processing television signals;

a second tuner and signal processing arrangement for receiving and processing television signals;

user-operable data input circuitry adapted to receive user-entered data or commands;

a controller responsive to said user-entered data or commands for generating control signals;

memory circuitry for storing data relating to television shows on a plurality of channels, and storing tuning information for said plurality of channels;

a decoder for receiving and decoding said data relating to television shows on said plurality of channels;

an on-screen display circuit for generating on-screen display signals; and a secondary image processor for generating signals which when displayed on a display screen cause the display of a secondary image;

said controller, in response to the entering of a BROWSE command by a user maintains a currently tuned channel on said first tuner for providing a main image, causes said on-screen display circuit to display text relating to a television show currently-running on a second channel, and operates in a first mode when said secondary image is not active at the time said BROWSE command is received, or in a second mode in which said secondary image is active at the time said BROWSE command is received;

said controller, in said first operating mode, causes said second tuner to tune said second channel for providing said secondary image and causes said secondary image processor to display said secondary image, and in said second operating mode does not cause said second tuner to tune another channel.

5. The television receiver of claim 4 wherein, said controller causes a display of a menu-selectable option which when selected by a user causes said first operating mode to be enabled.

6. The television receiver of claim 4 wherein, in said first operating mode, in response to said BROWSE command entered by a user, said secondary image is displayed in an area of said display screen not occupied by said text relating to said television show currently-running on said second channel, and a message is displayed indicating that said secondary image and said text are related.

7. The television receiver of claim 4 wherein, in said second operating mode, in response to said BROWSE command entered by a user, said secondary image is displayed in an area of said display screen not occupied by said text relating to said television show currently-running on said second channel, and a message is displayed indicating that said secondary image and said text are not related.

8. A television receiver, comprising:

a first tuner and signal processing arrangement for receiving and processing television signals;

a second tuner and signal processing arrangement for receiving and processing television signals;

user-operable data input circuitry adapted to receive user-entered data or commands;

a controller responsive to said user-entered data or commands for generating control signals;

memory circuitry for storing data relating to television shows on a plurality of channels, and storing tuning information for said plurality of channels;

a decoder for receiving and decoding said data relating to television shows on said plurality of channels, said decoder having an output coupled to said controller;

an on-screen display circuit for generating on-screen display signals; and a secondary image processor for generating signals which when displayed on a display screen cause the display of a secondary image;

said controller, in response to the entering of a BROWSE command by a user maintains a currently-tuned channel on said first tuner for providing a main image, tunes a second channel on said second tuner for providing said secondary image, causes said secondary image processor to display said secondary image and causes said on-screen display circuit to display text relating to a television show currently-running on said second channel;

said controller in response to an ENTER command, by said user, causes said first tuner to tune to said second channel, removes said text from said display screen, and causes said secondary image processor to stop displaying said secondary image.

9. A television receiver, comprising:

a first tuner and signal processing arrangement for receiving and processing television signals;

a second tuner and signal processing arrangement for receiving and processing television signals;

a switch having a first input for receiving signals from said first tuner, a second input for receiving signals from a second tuner, and an output for developing a signal selected from said first input or said second input in response to a switch control signal;

user-operable data input circuitry adapted to receive user-entered data or commands;

a controller responsive to said user-entered data or commands for generating control signals;

memory circuitry for storing data relating to television shows on a plurality of channels, and storing tuning information for said plurality of channels;

a decoder for receiving and decoding said data relating to television shows on said plurality of channels, said decoder having an output coupled to said controller;

an on-screen display circuit for generating on-screen display signals; and a secondary image processor for generating signals which when displayed on a display screen cause the display of a secondary image;

said controller, in response to the entering of a BROWSE command by a user maintains a currently-tuned channel on said first tuner for providing a main image, tunes a second channel on said second tuner for providing said secondary image, causes said secondary image processor to display said secondary image and causes said on-screen display circuit to display text relating to a television show currently-running on said second channel said controller in response to an ENTER command, by a user, generates said switch control signal causing said second tuner to provide signals for said main image, removes said text from said display screen, and causes said secondary image processor to stop displaying said secondary image.

* * * * *